Jan. 11, 1938.  J. R. ISBERG  2,104,864
SUPPORT FOR BOOKS AND THE LIKE
Filed March 31, 1936
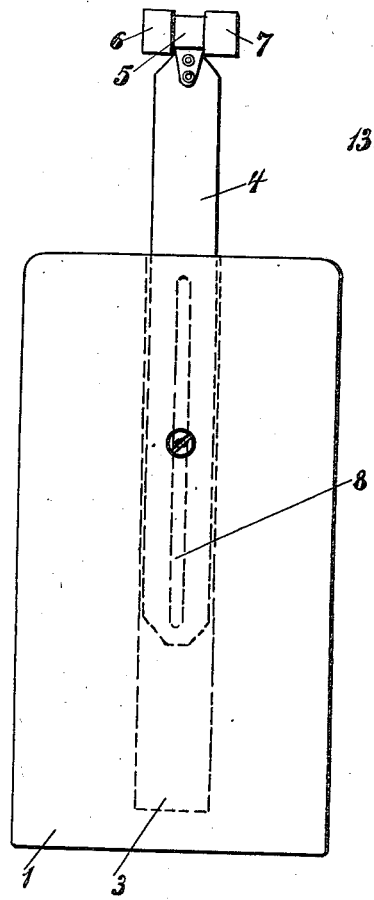
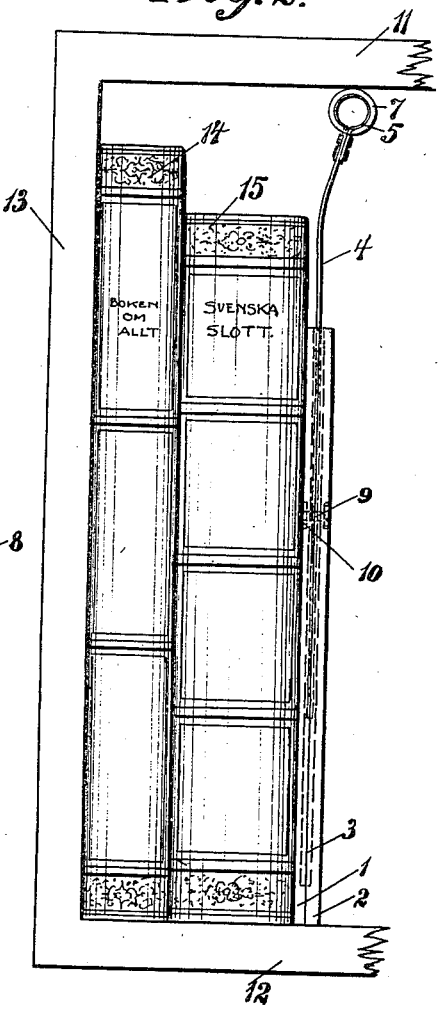
Inventor
Johan. Richard Isberg
By William E. P. Bayly
His Attorney.

Patented Jan. 11, 1938

2,104,864

UNITED STATES PATENT OFFICE 2,104,864

SUPPORT FOR BOOKS AND THE LIKE

Johan Richard Isberg, Uttran, Sweden

Application March 31, 1936, Serial No. 71,887
In Sweden April 15, 1935

1 Claim. (Cl. 211—43)

My invention relates to improvements in supports for books and the like and the essential feature of the invention in the fact, that the support may be used for keeping books, which only partly fill a bookshelf, standing straight up. The device is easy to operate and means are also provided for making the support useful for shelves of different heights.

Other features of the invention will be shown in the annexed drawing, which shows one embodiment of the same.

Fig. 1 is a view of the support.

Fig. 2 shows the support applied in a book shelf.

The support consists of two plates 1 and 2, which are connected to one another in some suitable manner, for instance, by means of nails, screws or glue. Between the plates 1 and 2 there is a longitudinal slot 3, in which there is a movable strip 4 of spring steel or the like. At its upper end, the strip 4 is supplied with a cylinder 5 of steel or the like. At the ends of the cylinder 5 there are rings 6 and 7 of elastic material, for instance, rubber. In order to make it possible to secure the strip in proper position for shelves of different heights there is in the strip 4 a longitudinal slot 8 and through the plates 1 and 2 there is a bolt 9, which also goes through the slot 8 and which at its other end is supplied with a nut 10.

In Fig. 2 the support is shown as applied in a book shelf, which consists of the upper and lower walls 11, 12 and the end wall 13. In the shelf there are two books 14 and 15. Against these the support is pushed in such a manner, that the free end of the strip 4 comes further from the books than the plate 1, 2. When pressure is exerted upon the support, the strip 4 will push the cylinder 5 with the rubber rings 5 and 6 against the upper wall 11, thus locking it in desired position.

When the support is to be used for shelves of uniform height the strip may be firmly connected with the plate. The support can also consist of two plates, one upper and one lower, which are connected together in some suitable manner, for instance, by means of a strip of steel. The upper end of the support may also be supplied with a sloping edge between which and the upper wall of the shelf the rubber covered cylinder is squeezed when pressure is exerted upon the support. The lower end of the support may also be covered with some frictional material, for instance, rubber.

Having now fully described my invention, what I claim and desire to secure by Letters Patent, is:

A support for books comprising a flat two-piece member provided with a longitudinal recess formed from complementary recesses in the contacting faces of the two elements of the member and an aperture communicating with the longitudinal recess on each side of said member, a removable flexible metallic strip with a vertical slot inserted into said recess, adjustable means passing through said slot and apertures for varying the combined length of the flat member and strip, a cylindrical member fixed transversely to the outer end of said strip and a ring of resilient material on the respective ends of said cylindrical member, the arrangement being such that the flat member rests upon the lower shelf against a book in a substantially vertical position and the rubber rings engage frictionally with the underside of the shelf above.

JOHAN RICHARD ISBERG.